3,065,198
COATING COMPOSITIONS COMPRISING MELAMINE- AND UREA-FORMALDEHYDE RESINS IN COMBINATION WITH COPOLYMERS OF BETA-PHENALLYL ALCOHOL AND CONJUGATED 1,3-DIENES
John G. Abramo and Earl C. Chapin, Springfield, Mass., assignors to Monsanto Chemical Company, St. Louis, Mo., a corporation of Delaware
No Drawing. Filed Dec. 22, 1958, Ser. No. 781,883
2 Claims. (Cl. 260—45.2)

This invention relates to novel elastomeric copolymers. More particularly, it relates to novel elastomeric copolymers containing hydroxyl groups.

Copolymers of styrene and butadiene are widely used as synthetic elastomeric compositions in such applications as automobile tires, footwear, etc. However, these materials are deficient in that they are attacked by hydrocarbons and they exhibit poor adhesion to metal, wood, glass, fibrous, etc. surfaces. It has been found that under the constant tire pounding associated with high speeds and rough roads, the tire cords separate from the elastomeric casing, resulting in premature tire failure due to excessive wear, blow-outs, etc., and actually presenting a threat to public safety. These styrene-butadiene copolymers are also widely used in surface coating applications but their incompatibility with other surface coating resins, e.g., urea- or melamine-formaldehyde condensates, alkyd resins, etc., has prevented the full development of such applications.

It is an object of this invention to provide novel elastomeric copolymers.

Another object is the provision of novel elastomeric copolymers containing hydroxyl groups.

Another object is the provision of novel hydrocarbon resistant elastomeric copolymers which exhibit marked adhesion to wood, metal, glass, fibrous, etc. surfaces.

A further object is the provision of novel elastomeric copolymers which are compatible with other resinous compositions such as urea- and melamine-formaldehyde condensates, alkyd resins, etc.

These and other objects are attained by copolymerizing a mixture of from 25–98% by weight of a conjugated 1,3-diene and from 75–2% by weight of a 2-phenyl-3-hydroxy propene-1 by heating under autogenous pressure at a temperature of from 5–250° C.

The following examples are given in illustration of the invention and are not intended as limitations thereof. Where parts are mentioned they are parts by weight.

*Example I*

A stirred autoclave is charged with a mixture of 70 parts of butadiene, 30 parts of 2-phenyl-3-hydroxy propene-1, 70 parts of toluene and 0.2 part of ditertiarybutyl peroxide. The autoclave is purged of air using nitrogen and then sealed and heated at about 120° C. under autogenous pressure. Heating is continued until a pressure gauge attached to the autoclave indicates that the pressure within the autoclave has returned to substantially atmospheric pressure; circa 20 hours. The product is a clear, colorless gel swollen by the toluene solvent. Remove the toluene solvent by soaking the product in methanol for about 24 hours and decanting the liquid phase. After drying, a clear, colorless elastomeric copolymer is obtained. The yield is substantially 100% based upon initial monomers. Analysis shows the copolymer to contain about 3.8% hydroxyl groups by weight, corresponding to the theoretical 2-phenyl-3-hydroxy propene-1 content of 30% by weight.

*Example II*

A stirred autoclave is charged with a mixture of 75 parts of butadiene, 80 parts of 2-phenyl-3-hydroxy propene-1, 80 parts of toluene, 1 part of ditertiarybutyl peroxide and 1 part of tertiarybutyl mercaptan. The autoclave is purged of air using nitrogen and then is sealed and heated at 120° C. for about 20 hours, yielding a viscous solution of copolymer dissolved in unreacted monomers and toluene. The viscous solution is poured into an excess of methanol, precipitating a clear, colorless and tough elastomeric copolymer in about 60% yield. Analysis shows the copolymer to contain about 6.2% hydroxyl groups by weight, corresponding to a 2-phenyl-3-hydroxy propene-1 content of about 49% by weight.

*Example III*

A stirred autoclave is charged with a mixture of 75 parts of chloroprene, 80 parts of 2-phenyl-3-hydroxy propene-1, 80 parts of toluene, 1 part of ditertiarylbutyl peroxide and 1 part of tertiarylbutyl mercaptan. The autoclave is purged of air using nitrogen and then is sealed and heated at 180° C. for about 20 hours, yielding a viscous solution of copolymer dissolved in unreacted monomers and toluene. The viscous solution is poured into an excess of methanol, precipitating a clear, colorless and tough elastomeric copolymer in about 55% yield. Analysis shows the copolymer to contain about 6.0% hydroxyl groups by weight, corresponding to a 2-phenyl-3-hydroxy propene-1 content of about 47% by weight.

*Example IV*

A solution of 16 parts of an ethylene oxide adduct of nonyl phenol wherein the ethylene oxide has a degree of polymerization of 9 and 4 parts of dioctyl sodium sulfosuccinate dissolved in 500 parts of water is charged to a stirred autoclave and heated to 60° C. under a nitrogen atmosphere. A second solution consisting of 80 parts of 2-phenyl-3-hydroxy propene-1, 320 parts of isoprene and 2 parts of alpha-thionaphthol is pumped into the autoclave at a rate of 50 parts per hour. Simultaneously therewith, a third solution of 2 parts of potassium persulfate dissolved in 98 parts of water is also charged to the reactor at a rate of 12.5 parts per hour. The reaction mixture is continuously stirred and maintained at 60° C. throughout the addition of these solutions and for about 1 hour thereafter. The product is a stable, aqueous emulsion of copolymer. One hundred parts of the latex are added to 100 parts of a 5% aqueous sodium chloride solution, precipitating about 40 grams of a clear, colorless and tough elastomeric copolymer. The yield is substantially 100% based upon initial monomers. Analysis shows the copolymer to contain about 2.5% hydroxyl groups by weight, corresponding to the theoretical 2-phenyl-3-hydroxy propene-1 content of 20% by weight.

The 2-phenyl-3-hydroxy propene-1 monomers employed in this invention correspond to the general formula:

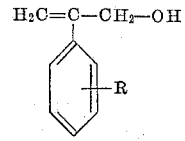

wherein R is either hydrogen or an alkyl radical containing from 1–4 carbon atoms. Therefore, in place of the 2-phenyl-3-hydroxy propene-1 employed in the examples may be substituted, for example, 2-(para-methylphenyl)-3-hydroxy propene-1, 2-(para-ethylphenyl)-3-hydroxy propene-1, 2-(meta-tertiarybutylphenyl)-3-hydroxy propene-1, etc. Such compounds may be readily prepared, for example, by the method taught by Butler in U. S. Patent 2,537,622 issued January 9, 1951 or by the method taught by Hatch and Patton in the Journal of the American Chemical Society, vol. 76, p. 2705, 1954.

The conjugated 1,3-diene monomers employed in this invention correspond to the general formula:

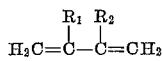

wherein $R_1$ and $R_2$ may be, independently, either hydrogen, fluorine, chlorine, bromine, cyano or methyl radicals. In place of the butadiene, choloprene and isoprene employed in the examples may be substituted, for example, 2-fluorobutadiene, 2,3-difluorobutadiene, 2-bromobutadiene, 2-bromo-3-methyl butadiene, 2-cyanobutadiene, 2-cyano-3-fluorobutadiene, 2-cyano-3-methylbutadiene, 2,3-dimethylbutadiene, 2-methyl-3-chlorobutadiene, etc. Mixtures of such conjugated 1,3-dienes may also be employed.

The novel elastomeric copolymers of this invention may be prepared using mass, solution or emulsion polymerization techniques.

In the mass and solution copolymerization processes, a monomeric mixture of from 25–98 parts of the conjugated 1,3-diene and from 75–2 parts of the 2-phenyl-3-hydroxy propene-1, all parts being parts by weight per 100 parts of total monomers, is heated at about 80–250° C. under at least autogenous pressures. The solvents suitable for use in the solution process are organic liquids which are inert to the reaction, e.g., toluene, xylene, benzene, dioxane, etc. Copolymerization may be thermally initiated but it is preferred to employ a small quantity of a free radical polymerization initiator such as, for example, hydrogen peroxide, ditertiarybutyl peroxide, benzoyl peroxide, tertiarybutyl perbenzoate, pinacolone peroxide, ditertiarybutyl hydroperoxide, azo-bis-isobutyronitrile, etc. The amount of such initiator employed will generally fall within the range of from about 0.05 to 5 parts by weight per 100 parts of total monomers. Somewhat greater or lesser amounts of initiator may be used if desired.

In the emulsion copolymerization process, a monomeric mixture of a conjugated 1,3-diene and a 2-phenyl-3-hydroxy propene-1 is continuously and slowly added to an excess of water maintained at the polymerization temperature of from 5–100° C. An emulsifying agent and a polymerization initiator are required. Either, or both, may be initially present in the water in whole or in part, or added as an aqueous solution along with the monomeric mixture. The monomeric proportions employed are as in the mass polymerization process described above, i.e., from 25–98 parts of conjugated 1,3-diene and from 75–2 parts of 2-phenyl-3-hydroxy propene-1 per 100 parts of total monomers. The amount of water to be used may be varied within wide limits. However, it is generally preferable to use from about 100–300 parts of water per 100 parts of monomer mixture in order to obtain latices containing from 25–50% solids by weight.

A wide variety of emulsifying agents may be used, alone or in admixture, such as salts of high molecular weight fatty acids, amino soaps, alkali metal salts of rosin acids, alkali metal salts of long-chain alkyl sulfates and sulfonates, ethylene oxide condensates of long-chain fatty acids, alcohols or mercaptans, sodium salts of sulfonated hydrocarbons, aralkyl sulfonate, etc. Examples of representative emulsifiers include sodium oleate, triethanolamine, sodium lauryl sulfate, salts of sulfosuccinic acid esters, the 2-ethylhexyl ester of sulfosuccinic acid, sodium salts of dioctyl sulfosuccinic acids, sodium salts of sulfated cetyl alcohol, nonyl phenol adducts of poly-ethylene oxides, etc. Generally, from about 0.1–5 parts by weight of emulsifier will be used per 100 parts of total monomers. However, somewhat greater or lesser amounts may be used if desired.

Polymerization initiators suitable for use in emulsion processes include free radical polymerization initiators such as potassium persulfate, ammonium persulfate, cumene hydroperoxide, redox recipes, etc. Examples of redox recipes include hydrogen peroxide, potassium persulfate, cumene hydroperoxide, tertiarybutylisopropylbenzene hydroperoxide, diisopropylbenzene hydroperoxide, etc. as the oxidative portion and ferrous sulfate, potassium ferricyanide, dihydroxyacetone, sodium formaldehyde sulfoxylate, triethanolamine, glucose, fructose, etc. as the reductive portion. Other known emulsion polymerization catalysts may also be used herein. The amount of such initiator employed will generally fall within the range of from about 0.05–5 parts by weight per 100 parts by weight of total monomers. Somewhat greater or lesser amounts of initiator may be used if desired.

The copolymers of this invention are clear and nearly colorless elastomers. They exhibit remarkable adhesion to natural and synthetic fibers such as cotton, rayon, nylon, etc. as well as to wood, metal, glass, etc. surfaces. These elastomeric copolymers are also compatible with other resinous materials such as melamine- and urea-formaldehyde condensates, alkyd resins, etc. In one embodiment, they may be compounded with such resins and subsequently cured therewith at elevated temperatures to produce modified elastomeric materials. Other curing agents such as di-isocyanate, di-acid chlorides, standard vulcanizing agents, etc. may be similarly employed. Whether so modified or not, the copolymers of this invention are useful in the production of automobile tires, footwear, laminating adhesives, etc.

*Example V*

Twenty parts of the elastomeric copolymer obtained in Example I are cold milled with 4 parts of a 50% solids by weight solution of a butyl ether of hexamethylol melamine dissolved in a 1:1 xylene-butanol mixture. The compounded material is then rolled into a thin, e.g., about 0.005 inch, film and the xylene-butanol solvent is allowed to evaporate. The material is then compression molded between two poly-tetrafluoroethylene coated steel plates at a temperature of 160° C. for 10 minutes. A clear, colorless rubber sheet is obtained which is insoluble in and only slightly swollen by kerosene, benzene or hexane.

*Example VI*

Example V is repeated, the compounded material being compression molded between two uncoated steel plates at 160° C. for 10 minutes. After cooling, the two plates cannot be separated without mechanical aid. The strength of the resinous bond is not weakened by immersion in kerosene, benzene, hexane, xylene or dimethyl formamide.

In most instances, the cured elastomeric copolymers of this invention will be highly resistant to attack by the common solvents such as, e.g., dioxane, xylene, dimethylformamide, toluene etc. However, if desired solvent soluble, gel-free, forms of these elastomeric copolymers may be made within the breadth of the processing conditions heretofore set forth. It has been found that by conducting the polymerization at temperatures above about 150° C. the product will contain little or no gel. Alternatively, gel-free, or nearly so, copolymers may also be obtained by interrupting the polymerization below about 75% conversion. In still another, and preferred method, gelation is avoided by adding to the monomeric reaction mixture from 0.05 to 5 parts by weight, per 100 parts of total monomers, of a chain transfer agent. Examples of suitable chain transfer agents include tertiarybutyl mercaptan, lauryl mercaptan, dodecyl mercaptan, trithiocarbamate, alpha-thionaphthol, 2-mercapto-4-phenylthiozole, etc. If desired, various combinations of these processing techniques may be used depending upon the product desired.

The gel-free elastomeric copolymers so obtained are soluble in common solvents such as, e.g., dioxane, xylene, dimethylformamide, toluene, etc. They may be employed in the applications heretofore described; in which case they may be rendered insoluble and solvent resistant by curing with other resinous materials or with cross-linking agents. However, these gel-free copolymers are particularly useful in the formulation of baking enamels, combined with, e.g., melamine- or urea-formaldehyde condensates.

*Example VII*

Ten parts of the elastomeric copolymer obtained in Example II are dissolved in 40 parts of a 1:1 xylene-butanol mixture. Eight parts of this 25% solids by weight solution are then mixed with 2 parts of a 50% solids by weight solution of a butyl ether of hexamethylol melamine dissolved in a 1:1 xylene-butanol mixture. The resulting clear solution is cast on a glass plate in a uniform 0.003 inch film and dried in a hot air oven for 20 minutes at 150° C. A clear, tough, glossy and adhesive film is obtained which is insoluble in xylene, xylene-butanol mixtures, hexane, dimethylformamide and 10% aqueous caustic solutions.

Those gel-free elastomers obtained by emulsion polymerization processes are especially suited for use as water base paints. The emulsions may be employed directly as obtained since the only modification required is the addition of pigments. However, conventional additives may also be incorporated therein, if desired.

*Example VIII*

One hundred parts of the latex obtained in Example IV are intimately mixed with 20 parts of rutile titanium dioxide, 40 parts of magnesium silicate and 5 parts of phthalocyanine blue pigment. The resulting blue colored latex paint is applied by brush to a plaster wall. After air-drying at room temperature for about 30 minutes the painted surface is dry and non-tacky to the touch. After 12 hours of drying the paint film is resistant to washing with water and a 10% aqueous caustic soda solution.

The elastomeric copolymers of this invention, whether compounded with other resinous materials or cross-linking agent or not, may be modified by the incorporation of conventional additives such as pigments, lubricants, fillers, stabilizers, plasticizers, etc.

It is obvious that many variations may be made in the products and processes set forth above without departing from the spirit and scope of this invention.

What is claimed is:

1. A coating composition comprising an organic solvent solution of (1) a thermosetting resin taken from the group consisting of melamine- and urea-formaldehyde condensation products and (2) a copolymer of from 2–75% by weight of a 2-phenyl-3-hydroxy propene-1 and from 98–25% by weight of a conjugated 1,3-diene; said 2-phenyl-3-hydroxy propene-1 corresponding to the general formula:

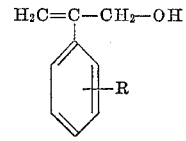

wherein R is a radical selected from the group consisting of hydrogen and alkyl radicals containing from 1–4 carbon atoms and said conjugated 1-3-diene corresponding to the general formula:

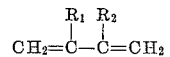

wherein $R_1$ and $R_2$ are radicals independently selected from the group consisting of hydrogen, fluorine, chlorine, bromine, cyano and methyl radicals.

2. A coating composition of claim 1 wherein the conjugated 1,3-diene is butadiene.

References Cited in the file of this patent

UNITED STATES PATENTS

| | | |
|---|---|---|
| 2,424,923 | Edgar et al. | July 29, 1947 |
| 2,537,622 | Butler | Jan. 9, 1951 |
| 2,834,747 | Short et al. | May 13, 1958 |

OTHER REFERENCES

Fordham et al.: J. Phys. Chem., volume 57, pages 346–9 (1953).